US011946629B1

(12) United States Patent
Nalbandyan et al.

(10) Patent No.: US 11,946,629 B1
(45) Date of Patent: Apr. 2, 2024

(54) HIGH POWER LED COMPACT SOURCE OF LIGHT

(71) Applicant: Luminys Systems Corp.

(72) Inventors: Ashot S Nalbandyan, North Hollywood, CA (US); Richard T Amadril, North Hollywood, CA (US)

(73) Assignee: LUMINYS SYSTEMS CORP., North Hollywood, CA (US)

( * ) Notice: Subject to any disclaimer, the term of this patent is extended or adjusted under 35 U.S.C. 154(b) by 0 days.

(21) Appl. No.: 18/109,687

(22) Filed: Feb. 14, 2023

(51) Int. Cl.
*F21V 29/58* (2015.01)
*F21S 4/28* (2016.01)
*F21V 31/00* (2006.01)

(52) U.S. Cl.
CPC ................ *F21V 29/59* (2015.01); *F21S 4/28* (2016.01); *F21V 31/005* (2013.01)

(58) Field of Classification Search
CPC ........... F21V 29/59; F21V 31/005; F21S 4/28
See application file for complete search history.

(56) References Cited

U.S. PATENT DOCUMENTS 6,590,217 B1 * 7/2003 Freeman ................... A61L 2/10 250/435
7,641,361 B2 * 1/2010 Wedell ................ F21V 19/0055 362/240
9,062,875 B2 * 6/2015 Neal ..................... F21V 31/005
10,030,863 B2 * 7/2018 Pickard ................... F21V 29/74
10,502,407 B1 * 12/2019 Spiro ...................... F21V 15/01
10,999,976 B2 * 5/2021 Lys ......................... F21V 15/01
11,118,777 B2 * 9/2021 Wu ....................... F21V 29/763
2007/0159828 A1 * 7/2007 Wang ...................... F21K 9/232 362/294
2010/0326633 A1 12/2010 Kwon
2012/0218757 A1 8/2012 Gill
2014/0268769 A1 9/2014 Tran
2016/0377277 A1 * 12/2016 Wei ......................... F21V 29/51 362/249.02
2017/0146226 A1 * 5/2017 Storey .................... A01G 7/045
2018/0045386 A1 2/2018 Baxter et al.
2020/0003354 A1 * 1/2020 Kanres .................... F16L 55/18
2020/0196413 A1 * 6/2020 Ellis ..................... H05B 45/335
2020/0378589 A1 * 12/2020 Edwards ............ B01D 19/0052
2021/0278072 A1 * 9/2021 Lys ........................... F21S 4/28
2021/0363476 A1 * 11/2021 Peretti .................... C12M 23/06

* cited by examiner

*Primary Examiner* — Tsion Tumebo
(74) *Attorney, Agent, or Firm* — Ladas & Parry, LLP

(57) ABSTRACT

A source of light comprising a first tube comprising a first lumen sealed by a distal cap and a proximal cap a plurality of LED sources having each a front, light-emitting side and a back side, the back side of the LED sources being attached to an outer surface of the first tube, a second tube having a proximal end and a distal end, the second tube passing through the proximal cap such that the distal end of the second tube opens within the first lumen closer to the distal cap than to the proximal cap, and the proximal end of the second tube opens outside of the proximal cap; and at least one third tube passing through the proximal cap.

21 Claims, 5 Drawing Sheets

HIGH POWER LED COMPACT SOURCE OF LIGHT

TECHNICAL FIELD

This presentation relates to sources of light; in particular LED sources of light of high power, in particular compact enough to be used in a practical manner in a parabolic reflector.

BACKGROUND

Light Emitting Diodes, or LED's, have changed the nature of many luminaire designs in the last few years, as designers have found ways to capitalize on the power efficiency and versatility that Light Emitting Diode (LED) offer with respect to traditional lamp technologies such as incandescent, metal Halide or High-Pressure Sodium. LEDs have overtaken most of the low wattage mass market lighting applications to date.

Although very power efficient and thought of as a generally "cool" light source, LEDs suffer a major drawback when it comes to creating larger and more powerful single source luminaries. Indeed, seventy five percent (75%) of the wattage fed to a LED is effectively lost to heat. That heat must be managed and dissipated for the LEDs to perform and function properly, unlike any traditional lamp-based luminaire.

LEDs are currently generally mounted (either SMD—Surface Mount Devices—or COB—Chip On Board) on flat bases comprising copper or another metal. It is known to solve the need for effective heat management in LED sources of light by mounting the LED PCB Board and optics on a front side of a Luminaire, and a heat sink and fixture mounting adaptors on a back side of the luminaire. These designs usually result in an LED PCB Board that is permanently part of the fixture. When the LEDs come to the end of their useful life, the whole fixture must then be replaced. It is also known to attach high power LED sources to the hot end of a heatpipe, the cold end of the heatpipe being connected to a radiator or other heat sink. The large amount of heat generated by the LED sources passes from the hot end of the heatpipe end to the cold end of the heatpipe such that the heat generated by the LED sources does not degrade the LED sources. The heat is then evacuated by the heatsink.

Further, a feature of LED light sources emitting from one flat plane (i.e. from a single angle of emission) is that a color consistency issue appears, which is known as the "color-over-angle" (CoA) issue. This issue is due to the fact that color varies with the angle by which it exits the LEDs. For example, a Blue LED Light that comes straight through the phosphor will mix properly and create the intended white light. On another hand, a Blue LED light that come out of the LEDs at an angle causes cause color variation. A known way to reduce or mitigate the negative effects of the CoA issue in LED source of lights is to use in combination a plurality of sources of light emitting each in a different direction. A reflector, which can generally be described as a parabolic reflector, then allows to collect the light emitted in all the different directions and to direct the collected light in a single chosen illumination direction and project light forward. It is known to attach low power LED sources around a tubular metallic support, for example to replace traditional automobile rear light bulbs at the center of the rear light reflectors. The small amount of heat generated by the LED sources required to produce as much light as the regular bulb passes into the support and from the support into the frame of the rear light. In such structures, the small amount of heat generated by the LED sources can dissipate and it does not degrade the LED sources.

It is theoretically possible to increase the amount of LEDs of such a small, low-power density structure to make a high-power density structure capable of delivering a much higher amount of light than e.g. a bulb of same size. In this presentation, a light source having a power density of the order of 25 Watts/cm$^2$ or more is considered to be a light source with "high power density". It is to be noted that traditional lamps such as those known by the commercial name of "Xenon Lamp SoftSuns" have a Power Density of at least 26 Watts/cm$^2$ and a Lumin Density of 940 Lumens/per cm$^2$. The power of such Xenon lamps can range from 25 KW to 100 Kw. The lamp grows larger with the power, but the Power Density and Lumen Density stay the same. The inventors have noted that a simple heat conducting support is not sufficient to evacuate the amount of heat generated by high-power density LED sources. Additional means to evacuate the heat are needed for high-power density LED sources, such as one or more heatpipes. A problem with heatpipes is that a single heatpipe can only evacuate a limited amount of heat for a given heatpipe size. There remain problems in that a single heatpipe needs to have a large size to evacuate a large amount of heat.

It follows that in order to generate a very large amount of light, using a plurality of high-power LED sources generating each a given large amount of heat, a plurality of large heatpipes of large size are required. Some specialty designed heatpipes can for example increase the heat flux limit out of one surface to more than 50 W/cm$^2$. A problem is that a LED source of light comprising a plurality of LED surfaces would require a plurality of large heatpipes, the size of which would prevent the LED source of light from being compact.

This in turns prevents using high-power LED sources in combination with for example parabolic reflectors, unless very large parabolic reflectors were built which would be too heavy and cumbersome for a practical use.

There exists a need for a high power density LED source arranged for generating a much larger amount of light, for a given volume of lamp, than a non-LED lamp of same volume, in particular for a lamp volume that remains small enough to be used in a parabolic reflector of practical size and weight.

SUMMARY

Embodiments of this presentation solve the above problem by attaching a large number of high power LED sources to a circumference of a hollow tubular heat conducting (e.g. metallic) support arranged for circulating a cooling fluid that can be pumped through the hollow support at a desired speed, thus allowing to evacuate a large amount of heat generated by the LED sources with a reduced support size, and therefore allowing the manufacture of compact high power LED sources that can be used in parabolic reflectors that are of practical size. For example, according to embodiments of this presentation a large number of high power LED sources can comprise from 6 to 12 High Power LED sources.

Embodiments of this presentation comprise a source of light that includes a first tube comprising a first lumen sealed by a distal cap and a proximal cap; a plurality of LED sources having each a front, light-emitting side and a back side, the back side of the LED sources being attached to an outer surface of the first tube; a second tube having a proximal end and a distal end, the second tube passing through the proximal cap such that the distal end of the second tube opens within the first lumen closer to the distal cap than to the proximal cap, and the proximal end of the second tube opens outside of the proximal cap; and at least one third tube passing through the proximal cap. The inventors have noted that when the distal end of the second tube opens within the first lumen closer to the distal cap than to the proximal cap, a fluid introduced into the first lumen by the second tube has reduced chances of forming stationary turbulences around the distal cap, and therefore circulates faster and evacuates heat more efficiently. This effect is even increased if an inner face of the distal cap is convex, For example cone-shaped.

According to embodiments of this presentation, the first tube and the second tube are concentric.

According to embodiments of this presentation, the second tube has an inner cross section and an inner perimeter, and the distal end of the second tube is at a distance from the distal cap such that said distance multiplied by said inner perimeter is larger than or equal to said inner cross section.

According to embodiments of this presentation, the second tube has an inner cross section, wherein the distal end of the second tube is attached to the distal cap, wherein a plurality of windows are opened in a periphery of the second tube at said distal end, such that a sum of a cross section of said windows is larger than or equal to said inner cross section.

According to embodiments of this presentation, the LED sources are attached at regular interval to a periphery of the outer surface of the first tube.

According to embodiments of this presentation, the source of light comprises at least one protrusion extending from an inside wall of the first lumen; said at least one protrusion being arranged to increase heat exchange between the first tube and a fluid flowing through the first lumen.

According to embodiments of this presentation, the first tube and the second tube are concentric and the at least one protrusion comprises a plurality of protrusions extending radially from the inside wall of the first lumen toward the second tube.

According to embodiments of this presentation, the at least one protrusion does not contact the second tube.

According to embodiments of this presentation, the at least one protrusion has a length smaller than a length of the first tube.

According to embodiments of this presentation, the at least one protrusion does not contact the proximal cap or the proximal cap.

According to embodiments of this presentation, the source of light comprises a pump arranged for filling up the first tube with a fluid flowing from the second tube, through the first tube and into the at least one third tube.

According to embodiments of this presentation, the pump has an output connected to the proximal end of the second tube and an input connected to a reservoir containing said fluid; a proximal end of said at least one third tube being connected to an input of said reservoir.

According to embodiments of this presentation, the source of light further comprises a heat extraction device arranged between the proximal end of said at least one third tube and the reservoir, to extract heat from the fluid passing from the third tube into said reservoir. The heat extraction device can comprise a radiator device and optionally one or more fans that force air circulation along the radiator. The speed of the fan(s) can be a function of the speed of the pump.

According to embodiments of this presentation, the source of light further comprises a power circuit arranged for powering said pump as well as said LED sources.

According to embodiments of this presentation, the power circuit is arranged to automatically regulate a speed of the pump/fluid flowing through the first tube as a function of the electrical power provided to said LED sources.

According to embodiments of this presentation, the fluid is water.

According to embodiments of this presentation, the first tube is made of metal.

According to embodiments of this presentation, the first tube comprises flat walls attached to each other at an angle, said back side of the LED sources attached to an outer surface of the first tube being attached to an outer surface of said flat walls.

According to embodiments of this presentation, the outer surface of said flat walls comprise rail protrusions with grooves allowing to attach said LED sources to said outer surface of said flat walls by sliding said LED sources in the grooves of said rail protrusions.

According to embodiments of this presentation, the second tube has an axis of same direction as an axis of the first tube and said at least one third tube has an axis that does not have a same direction as the axis of the second tube.

FIGURES

The above features will now be described in more details in relation with the following figures, wherein.

DETAILED DESCRIPTION

Figure 1:
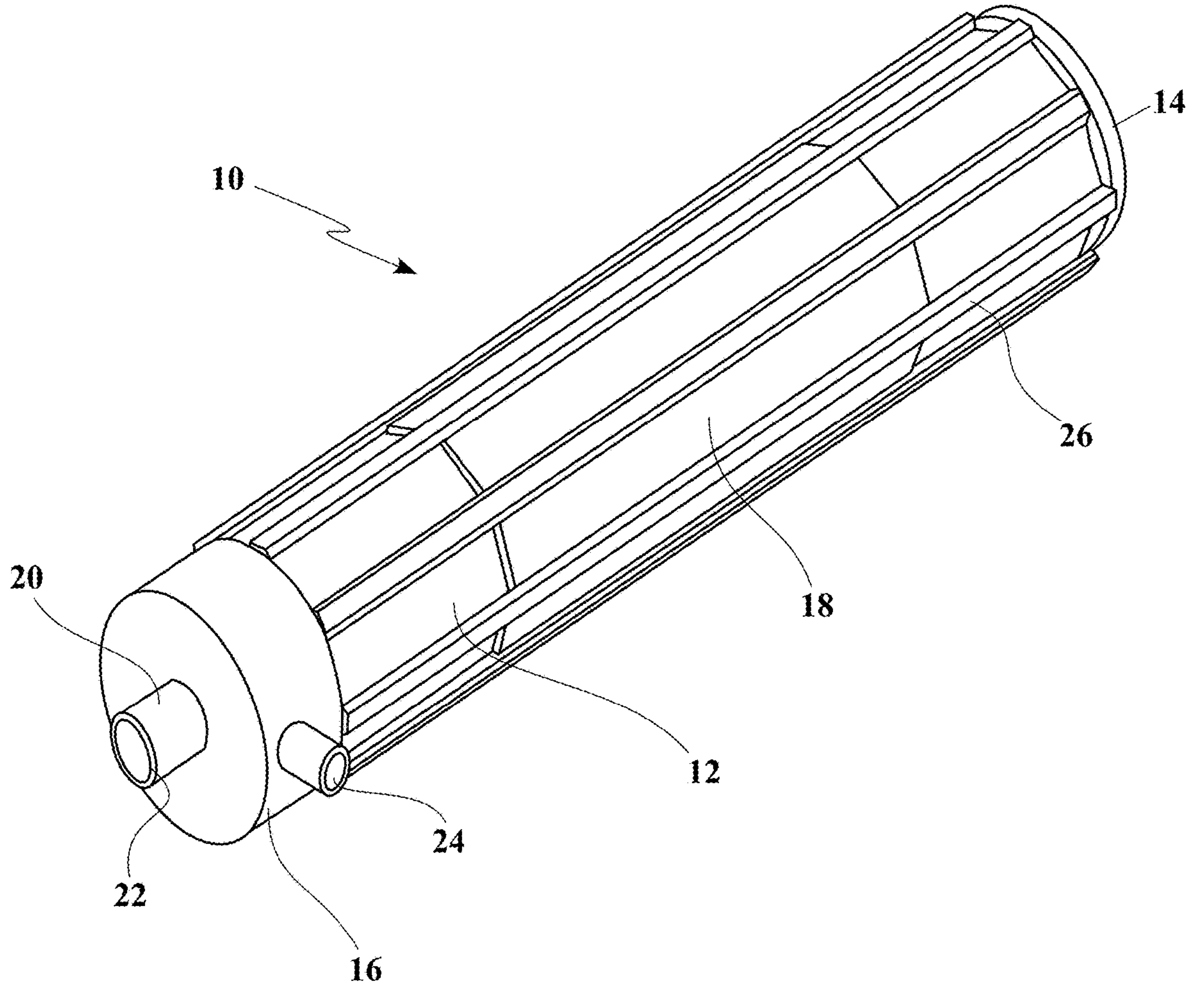
FIG. 1 illustrates an elevation view of a portion of a high-power LED source of light according to embodiments of this presentation.

The following description is presented to enable one of ordinary skill in the art to make and use the teachings of this presentation and to incorporate them in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of embodiments of this presentation. However, it will be apparent to one skilled in the art that such embodiments may be practiced without necessarily being limited to these specific details.

All the features disclosed in this presentation, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112, Paragraph 6.

A high-power LED source of light according to embodiments of this presentation comprises two portions: a Fixture Head portion and a Power Supply portion). Preferably, all control buttons, HMI (Human machine interface), and DMX lighting protocol controls are housed in the Power Supply portion, whereas the Fixture Head portion has no user controls and only electrical connections to the Power Supply portion, to aid in weather protection design.

According to embodiments of this presentation, the fixture Head portion houses a "Cooling Loop", which includes a fluid pump, a fluid radiator, a fluid tank, and connecting hoses/tubes in a backend box. According to embodiments of this presentation, a front assembly of the fixture Head portion includes an extruded LED Lamp, a reflector, and optionally a spot and flood motor and assembly.

According to embodiments of this presentation, the Power Supply portion is electrically coupled to the fixture Head portion and arranged to drive the LED lamp in the fixture Head portion with constant current drivers. The Power supply portion is arranged to control the functions of main power on/off, lamp on/off, dimming, color change, and spot and flood. Constant current LED drivers are very common parts in the market place like the one commercialized under the name "Mean Well HLG-150H-12".

According to embodiments of this presentation, the Lamp in the fixture head will emit light in all directions, as many traditional lamp do, having high power LED Chip On Board (COBs) arranged around tubes having a polygonal cross-section (for example Hexagonal or Octogonal). The tube can be a metal (e.g. aluminum) extrusion flat, and the COB's can be firmly held down by aluminum bars or rails attached (e.g. screwed) to the outside walls of the tube. Such an arrangement of the COB's in the lamp allows mimicking a continuous light-emitting cylindrical surface, and thus allows using cylindrical reflectors around the lamp. According to embodiments of this presentation, no COBs are attached at a distal end of the tube, such that only light emitted radially by the lamp, then reflected by a parabolic reflector around the lamp, is emitted by the fixture head along the axis of the parabolic reflector.

According to embodiments of this presentation, the tube is hollow and comprises in its lumen one or more inward protrusions or fins, for example radial fins, to help exchanging heat between the tube material and a fluid circulating within the tube. According to embodiments of this presentation, a fluid flows from a distal part of the tube lumen to a proximal part of the tube lumen, where tube outlet allows evacuating the fluid. A smaller diameter tube (e.g. aluminum) is arranged inside the lumen to introduce the fluid at a predetermined distance of the distal end of the tube. The distal end of the tube is capped by a distal cap such that the fluid introduced in the tube lumen by the smaller diameter tube hits the distal cap and mushrooms back to the proximal part of the tube lumen.

According to embodiments of this presentation, the fluid can be pumped through the hollow support/tube at a desired speed, thus allowing to evacuate a large amount of heat with a relatively small size. This allows the manufacture of compact high power LED sources that can be used in parabolic reflectors that are easy to manipulate. According to embodiments of this presentation, the fixture head portion can be separated from the power supply portion, which allows reduced costs of operation.

FIG. 1 illustrates a portion of a fixture head portion of a LED lamp, or source of light, 10 according to embodiments of this presentation, comprising a first tube 12 comprising a first lumen (not shown in FIG. 1) sealed by a distal cap 14 and a proximal cap 16; a plurality of LED sources 18 (such as LED Chip on Boards, with rectangular boards illustrated) having each a front, light-emitting side and a back side, the back side of the LED sources 18 being attached to an outer surface of the first tube 12. According to embodiments of this presentation, the source of light 10 comprises a second, smaller diameter, tube 20 having a proximal end 22 and a distal end (not shown in FIG. 1), the second tube 20 passing through the proximal cap 16 such that the distal end of the second tube 20 opens within the first lumen closer to the distal cap 14 than to the proximal cap 16, and the proximal end 22 of the second tube 20 opens outside of the proximal cap 16; and at least one third, also smaller diameter, tube 24 passing through the proximal cap 16. Only one third tube 24 is illustrated in FIG. 1 but two or more third tubes 24 can be used, for example arranged regularly on the periphery of the proximal cap 16. Also, the at least one third tube 24 is illustrated with an axis not parallel to the axis of the second tube 20, but the at least one third tube 24 can also have an axis parallel to the axis of the second tube 20.

According to embodiments of this presentation, the LED sources 18 are attached at regular interval to a periphery of the outer surface of the first tube 12. According to embodiments of this presentation, the LED sources 18 comprise flat boards attached to the outer surface of tube 12 using rail protrusions 26 attached to the outer surface of tube 12, the rails 26 having a longitudinal axis parallel to the axis of tube 12 and having longitudinal grooves such that opposed edges of the LED sources 18 can be maintained in the grooves of consecutive rails 26. The rails 26 can be formed in one piece with the tube 12, in which case the LED sources 18 can be slid along the grooves, or the rails can be attached (e.g. with screws) to the tube 12 after positioning the LED sources on the outer surface of tube 12.

Figure 2:
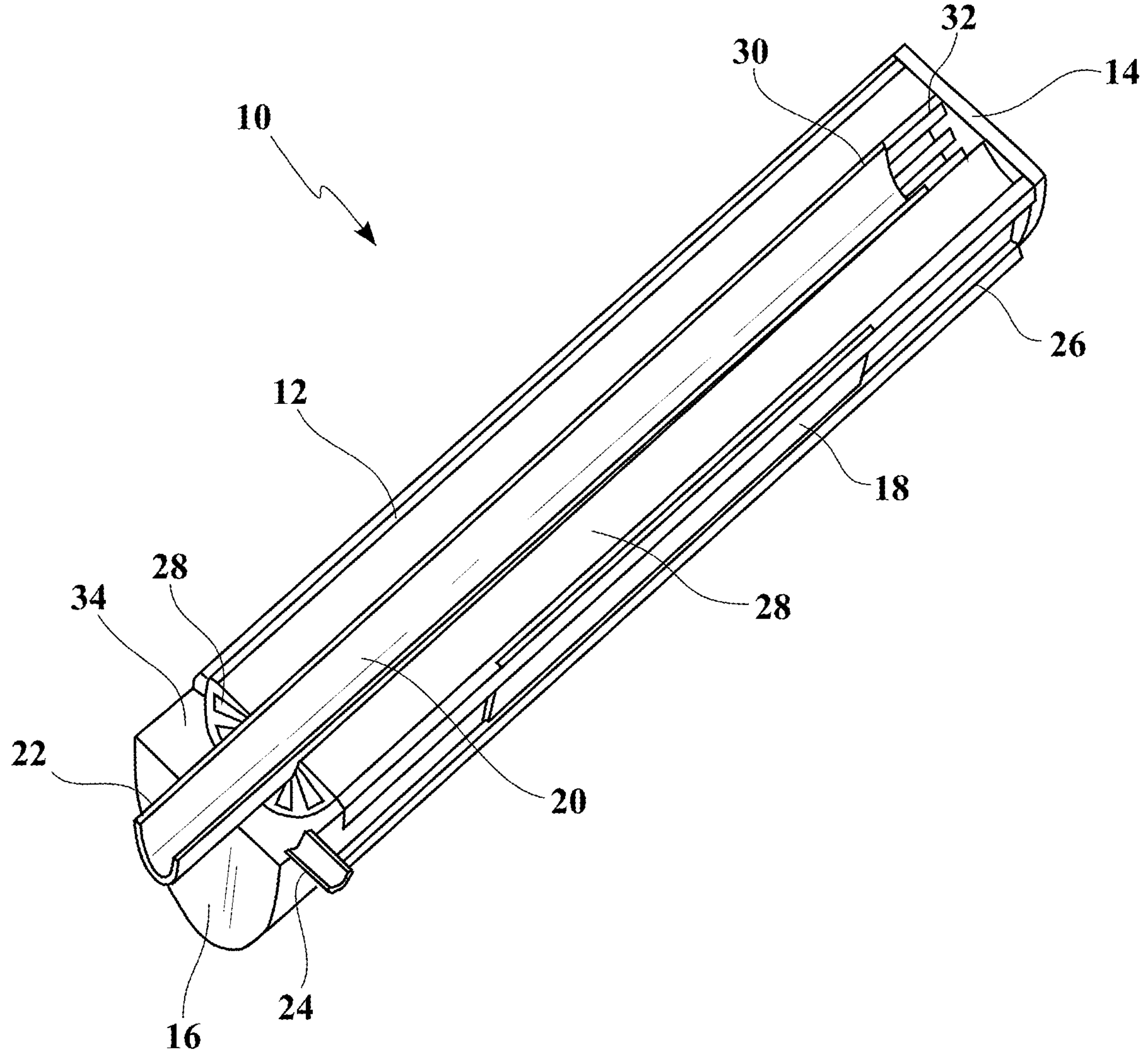
FIG. 2 illustrates a cutaway view of the portion of the source of light of FIG. 1 along an axial plane.

FIG. 2 illustrates a cutaway view of the portion 10 of the source of light of FIG. 1 along a plane containing the axis of tube 12, showing the lumen 28 of tube 12 as well as the distal end 30 of tube 20. As illustrated in FIG. 2, the tube 12 and the tube 20 can be concentric. According to embodiments of this presentation a fluid, such as water, is introduced at a distal end of the lumen 28 of tube 12 by the distal end 30 of tube 20, where it hits an inner surface of distal cap 14 and mushrooms back to the proximal cap 16, where it exits the lumen through tube 24. According to embodiments of this presentation, at least one protrusion or fin 32 extends from an inside wall of tube 12 into the lumen 28, said at least one protrusion 32 being arranged to increase heat exchange between the tube 12 and a fluid flowing through the lumen 28. In practice and as illustrated in FIG. 2, said at least one protrusion 32 comprises a plurality of protrusions 32, for example extending each from the inner wall of tube 12 toward the axis of tube 12, along longitudinal planes containing each a radius of tube 12. Such an embodiment provides a plurality of fluid paths along directions parallel to the axis of tube 12. Said at least one protrusion 32 may, or may not contact the tube 20. According to embodiments of this presentation, the at least one protrusion 32 does not contact at least the proximal cap 16, so as to form a proximal protrusion-less chamber 34 in the immediate vicinity of proximal caps 16. According to embodiments of this presentation, the at least one protrusion 32 can extend along the whole length of the lumen 28, and the cap 16 can be hollow with a depth sufficient to form a proximal protrusion-less chamber. According to another embodiment (not illustrated), instead of following longitudinal planes, the longitudinal protrusions can alternatively follow each a helical plane so as to provide a plurality of "Archimedes screw" fluid paths to better spread heat evacuation.

According to embodiments of this presentation, the respective dimensions of the tubes 12, 20 and 24 are such that the fluid can circulate the tube 20 without being slowed by the cross-section available for fluid flow in tube 12. According to embodiments of this presentation, tube 20 has an inner cross section and an inner perimeter, and the distal end 30 of the second tube is at a distance from the distal cap 14 such that said distance, multiplied by said inner perimeter, is larger than or equal to said inner cross section. According to other embodiments of this presentation (not illustrated), tube 20 has an inner cross section, the distal end 30 of tube 20 is attached to the distal cap 14, and a plurality of windows are opened in a periphery of the tube 20 at the distal end 30, such that a sum of a cross section of said windows is larger than or equal to said inner cross section of tube 20.

Figure 3:
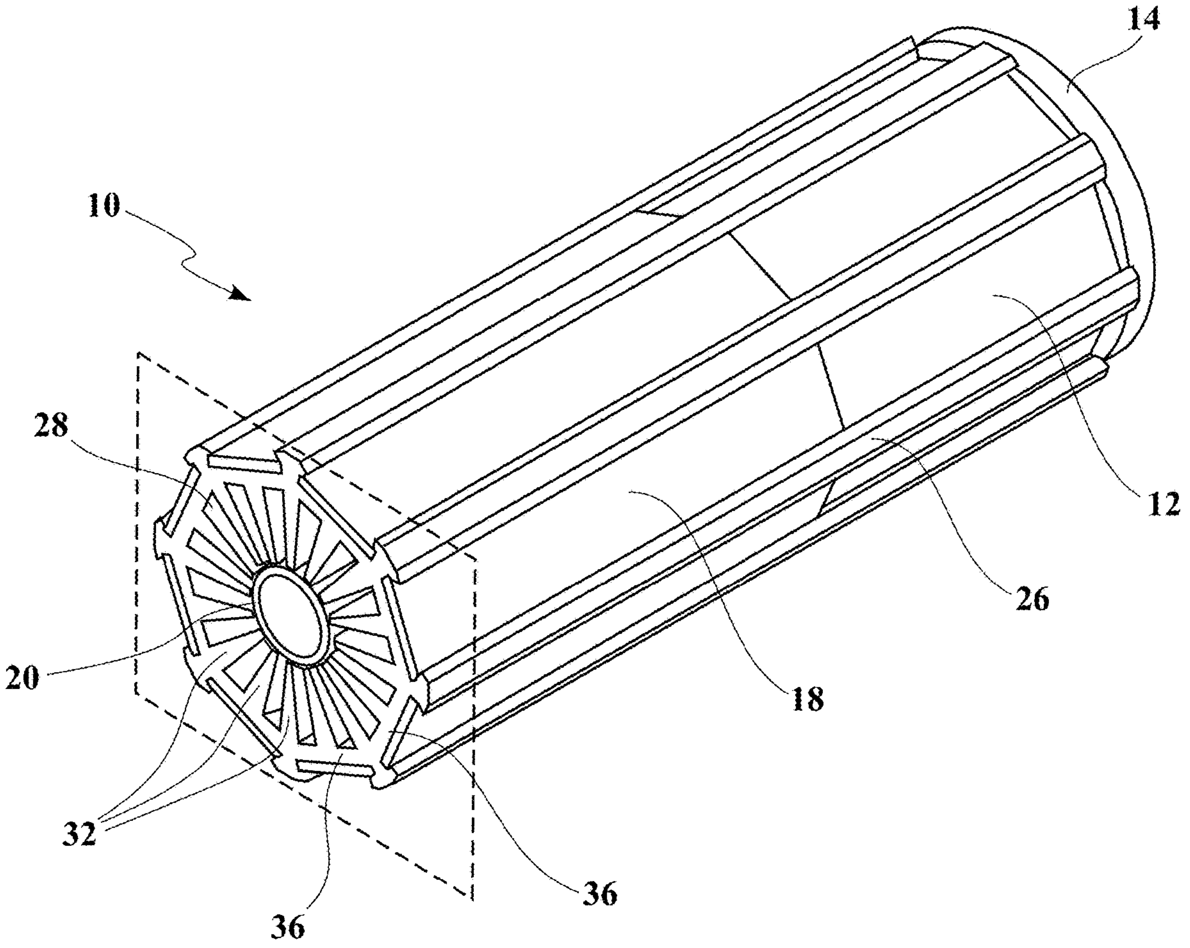
FIG. 3 illustrates a cutaway view of the portion of the source of light of FIG. 1 along a radial plane.

FIG. 3 illustrates a cutaway view of the portion of the source of light 10 along a radial plane, showing the at least one fin/protrusion 32 in the lumen 28 of tube 12. The figure also illustrates that tube 12 can comprise longitudinally extending flat walls 36 attached to each other at an angle, whereby the back side of each LED source 18 can be flat and attached to said flat walls.

Figure 4:
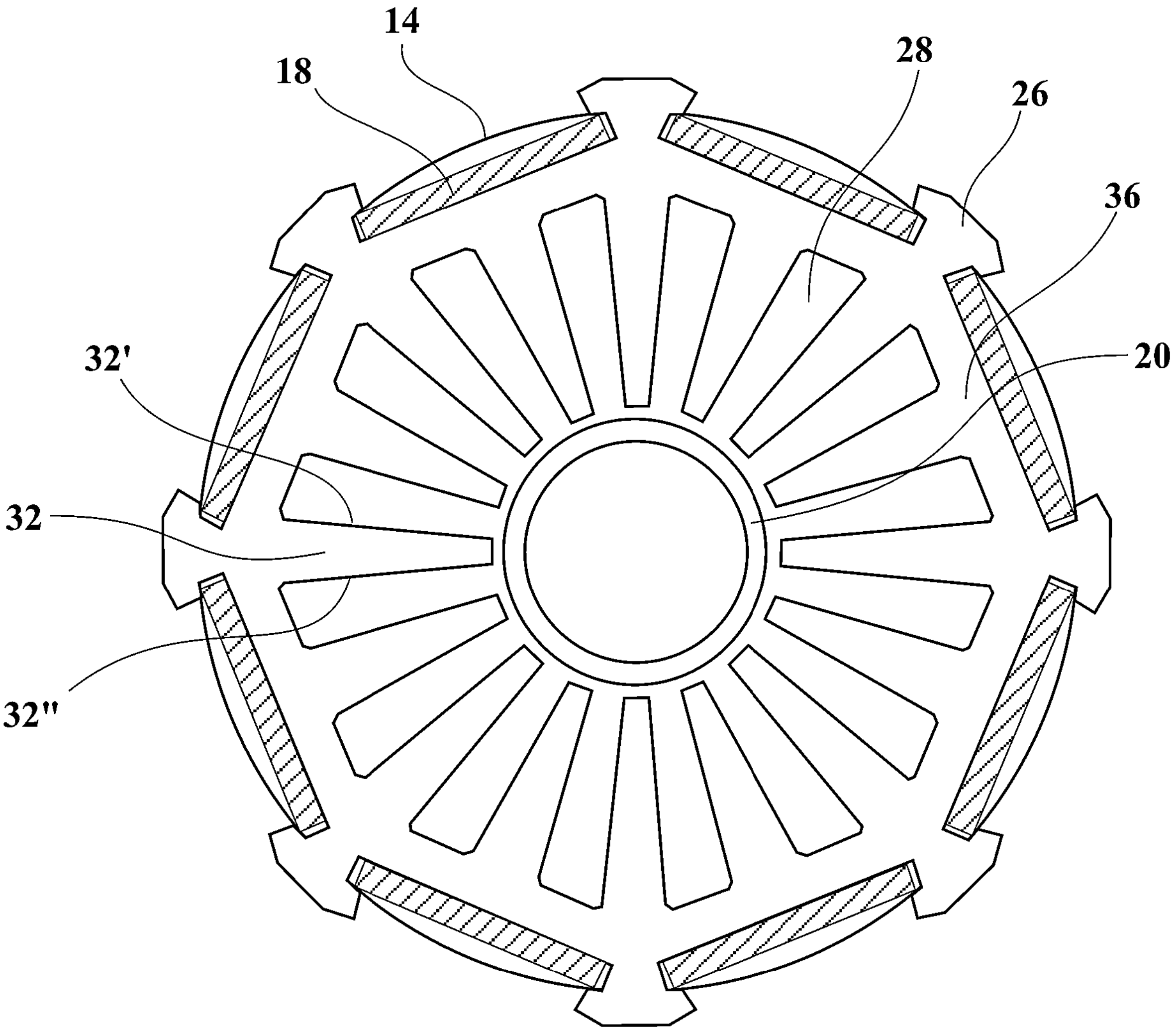
FIG. 4 illustrates in more detail the cross section shown in FIG. 3.

FIG. 4 illustrates in more detail the cross section shown in FIG. 3. As illustrated, each protrusion of fin 32 can comprise non-parallel longitudinal walls 32', 32" and have an essentially triangular cross-section. According to another embodiment (not illustrated), the longitudinal walls 32', 32" of the protrusions 32 can be parallel, thus conferring a rectangular cross-section to protrusions 32. In the illustrated embodiment, tube 12 comprises 16 protrusions 32. Tube 12 can comprise between 10 and 30 protrusions 32. Preferably, tube 12 comprises between 14 and 24 protrusions 32.

Figure 5:
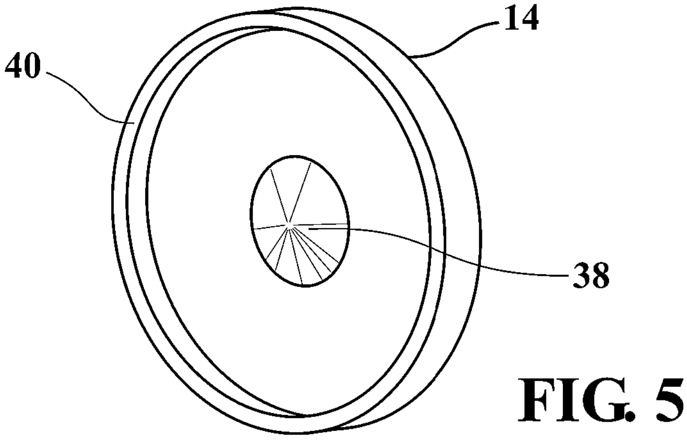
FIG. 5 illustrates a view of an inner surface of a distal cap of a source of light as illustrated in FIG. 1.
Figure 6:
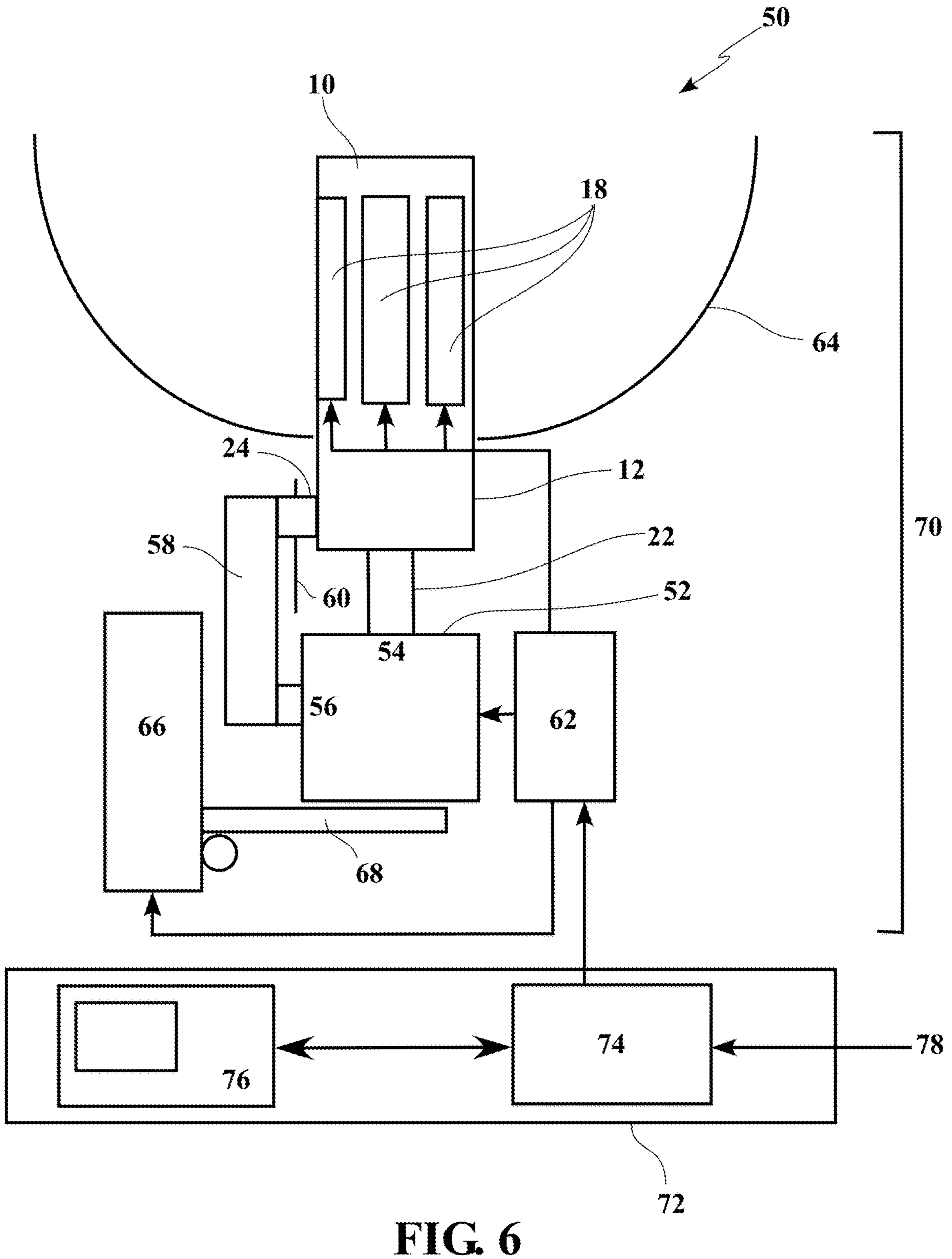
FIG. 6 illustrates a complete source of light according to embodiments of this presentation.

FIG. 5 illustrates a view of an inner surface of distal cap 14, comprising a central cone 38, the apex of which is arranged to be aligned with the axis of tube 20 to help the fluid coming from tube 20 mushroom toward the walls of lumen 28 and reduce fluid flow resistance. Distal cap 14 can have a peripheral flange 40 that facilitates attaching distal cap 14 to the distal end of tube 12, for example by welding or using matching threadings FIG. 6 illustrates a complete source of light 50 according to embodiments of this presentation, comprising a source of light portion 10 such as described above, attached to a pump 52 having an output 54 connected to the proximal end 22 of tube 20, the pumb being arranged for filling up tube 12 with a fluid (for example water) flowing from tube 20, through tube 12 and into tube 24. According to embodiments of this presentation, pump 52 has an input 56 connected to a reservoir 58 containing the fluid; a proximal end of tube 24 being connected to an input of reservoir 58. According to embodiments of this presentation, source of light 50 further comprises a heat extraction device 60, such as a radiator, arranged between the proximal end of tube 24 and reservoir 58, to extract heat from the fluid passing from the third tube into said reservoir. According to embodiments of this presentation, source of light 50 further comprises a power circuit 62 arranged for powering pump 52 as well as LED sources 18. According to embodiments of this presentation, power circuit 62 is arranged to automatically regulate a speed of the fluid flowing through the first tube as a function of the electrical power provided to said LED sources, so as to maintain the temperature of the LED lights 18 within a working range. Optionally, source of light 50 can comprise a parabolic reflector 64 arranged for directing the light emitted by light source portion 10 into a beam, as well as a spot and flood motor 66 and corresponding assembly 68 for moving the light source portion 10 with respect to the reflector 64. As outlined previously, the light source portion 10, pump 52, reservoir 58 and power circuit 62 form a fixture Head portion 70 of source of light 50. As also outlined previously, source of light 50 can also comprise a power supply portion 72 comprising a power supply 74 and a user interface 76, wherein power supply 74 is arranged for receiving power from a plug 78 connected to an exterior power source and powering power circuit 62 as well as user interface 76. Fixture head portion 70 can be removably connected to power supply portion 72, thus allowing to replace only fixture head portion 70 when the LED lights 18 are damaged.

Embodiments of this presentation comprise a 5 Kw LED lamp that has a Power Density of 31 Watts/per cm$^2$, and a Lumen Density of 2,666 Lumens per cm$^2$. This represents 2.8 to 3 times the Lumen Density of a traditional xenon lamp of a same volume or order of volume.

Embodiments of this presentation also comprise the LED lamp disclosed above, but where the LEDs (or bars of LEDs) are assembled directly on the hollow tube heat conductor rather than on boards, thus making the cross section of the lamp as circular as possible.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112(f), sixth paragraph, unless the element is expressly recited using the phrase "means for . . . " and no method or process step herein is to be construed under those provisions unless the step, or steps, are expressly recited using the phrase "comprising the step (s) of . . . .".

All elements, parts and steps described herein are preferably included. It is to be understood that any of these elements, parts and steps may be replaced by other elements, parts and steps or deleted altogether as will be obvious to those skilled in the art.

What is claimed is:

1. A source of light comprising:

a first tube comprising a first lumen sealed by a distal cap and a proximal cap;

a plurality of LED sources having each a front, light-emitting side and a back side, the back side of the LED sources being attached to an outer surface of the first tube;

a second tube having a proximal end and a distal end, the second tube passing through the proximal cap such that the distal end of the second tube opens within the first lumen closer to the distal cap than to the proximal cap, and the proximal end of the second tube opens outside of the proximal cap; and at least one third tube passing through the proximal cap and communicating with first lumen, such that a fluid introduced by the proximal end of the second tube flows from the distal end of the second tube into the first lumen and exits the first lumen through the third tube: wherein said fluid does not exit through the distal cap.

2. The source of light of claim 1, wherein the first tube and the second tube are concentric.

3. The source of light of claim 1, wherein the second tube has an inner cross section and an inner perimeter, and wherein the distal end of the second tube is at a distance from the distal cap such that said distance multiplied by said inner perimeter is larger than or equal to said inner cross section.

4. The source of light of claim 1, wherein the second tube has an inner cross section, wherein the distal end of the second tube is attached to the distal cap and wherein a plurality of windows are opened in a periphery of the second tube at said distal end, such that a sum of a cross section of said windows is larger than or equal to said inner cross section.

5. The source of light of claim 1, wherein the LED sources are attached at regular interval to a periphery of the outer surface of the first tube.

6. The source of light of claim 1, comprising at least one protrusion extending from an inside wall of the first lumen; said at least one protrusion being arranged to increase heat exchange between the first tube and a fluid flowing through the first lumen.

7. The source of light of claim 6, wherein the first tube and the second tube are concentric and wherein said at least one protrusion comprises a plurality of protrusions extending radially from the inside wall of the first lumen toward the second tube.

8. The source of light of claim 6, wherein said at least one protrusion does not contact the second tube.

9. The source of light of claim 6, wherein said at least one protrusion has a length smaller than a length of the first tube.

10. The source of light of claim 6, wherein said at least one protrusion does not contact the proximal cap or the proximal cap.

11. The source of light of claim 1, comprising a pump arranged for filling up the first tube with a fluid flowing from the second tube, through the first tube and into the at least one third tube.

12. The source of light of claim 11, wherein said pump has an output connected to the proximal end of the second tube and an input connected to a reservoir containing said fluid; a proximal end of said at least one third tube being connected to an input of said reservoir.

13. The source of light of claim 12, further comprising a heat extraction device arranged between said proximal end of said at least one third tube and said reservoir, to extract heat from the fluid passing from the third tube into said reservoir.

14. The source of light of claim 11, further comprising a power circuit arranged for powering said pump as well as said LED sources.

15. The source of light of claim 14, wherein said power circuit is arranged to automatically regulate a speed of the fluid flowing through the first tube as a function of the electrical power provided to said LED sources.

16. The source of light of claim 11, wherein said fluid is water.

17. The source of light of claim 1, wherein said first tube is made of metal.

18. The source of light of claim 1, wherein said first tube comprises flat walls attached to each other at an angle, said back side of the LED sources attached to an outer surface of the first tube being attached to an outer surface of said flat walls.

19. The source of light of claim 1, wherein said outer surface of said flat walls comprise rail protrusions with grooves allowing to attach said LED sources to said outer surface of said flat walls by sliding said LED sources in the grooves of said rail protrusions.

20. The source of light of claim 1, wherein said second tube has an axis of same direction as an axis of said first tube and said at least one third tube has an axis that does not have a same direction as the axis of the second tube.

21. The source of light of claim 1, wherein the second tube has openings only at its proximal end and its distal end.

* * * * *